(12) United States Patent
Otto

(10) Patent No.: US 6,459,967 B1
(45) Date of Patent: Oct. 1, 2002

(54) DEVICE FOR CONTROLLING AND MONITORING A VEHICLE

(75) Inventor: Stefan Otto, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,341

(22) PCT Filed: Jun. 24, 1999

(86) PCT No.: PCT/DE99/01837

§ 371 (c)(1),
(2), (4) Date: Dec. 8, 2000

(87) PCT Pub. No.: WO00/13157

PCT Pub. Date: Mar. 9, 2000

(30) Foreign Application Priority Data

Aug. 28, 1998 (DE) .......................................... 198 39 193

(51) Int. Cl.⁷ .................................................. G06F 7/00
(52) U.S. Cl. .............................. 701/29; 701/33; 701/35; 701/200

(58) Field of Search .................................. 701/1, 29, 30, 701/33, 34, 35, 200, 207, 216

(56) References Cited

U.S. PATENT DOCUMENTS 5,334,986 A * 8/1994 Fernhout ................ 342/357.14
5,367,463 A * 11/1994 Tsuji ........................... 701/216

FOREIGN PATENT DOCUMENTS

EP  0 523 860     1/1993
EP  0 565 191     10/1993

* cited by examiner

Primary Examiner—William A. Cuchlinski, Jr.
Assistant Examiner—Edward Pipala
(74) Attorney, Agent, or Firm—Kenyon & Kenyon

(57) ABSTRACT

A device for controlling and monitoring a vehicle having a first system having radio/driver information for example for positioning and/or navigational aids and a second system for evaluating data for vehicle technical operating statuses, in which the two systems are linked together in such a way that the data supplied by a single sensor are evaluated in both systems for different purposes.

15 Claims, 4 Drawing Sheets

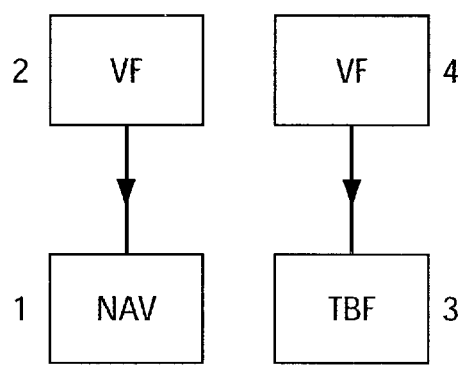
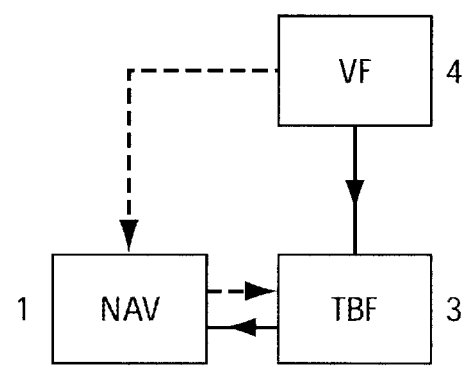
Fig. 1          Fig. 2
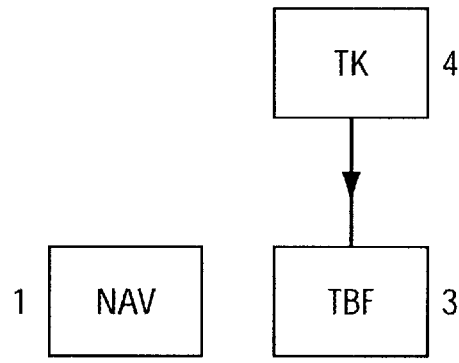
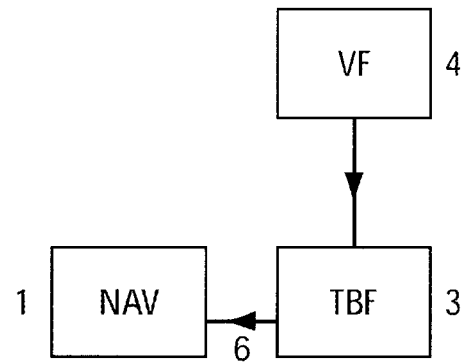
Fig. 3          Fig. 4
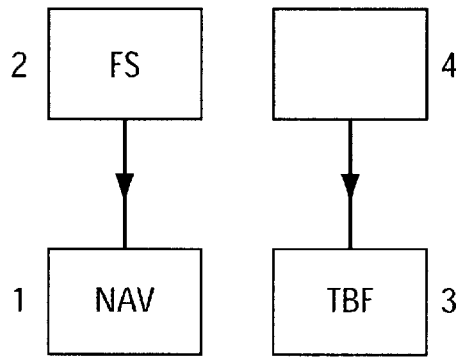
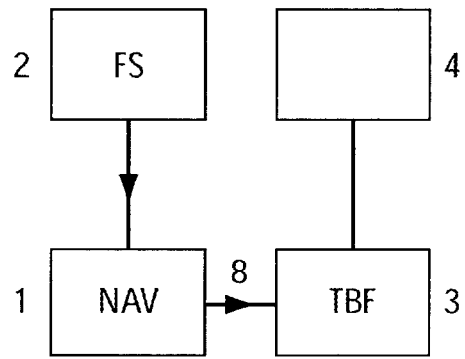
Fig. 5          Fig. 6

DEVICE FOR CONTROLLING AND MONITORING A VEHICLE

BACKGROUND INFORMATION

In vehicles, in particular motor vehicles, automatic positioning and navigational aids for guiding the driver to a desired destination can be provided so as to increase driving safety and improve driving comfort. The values for positioning are, for example, supplied by a GPS satellite navigation system (global positioning system). In addition, sensors or detectors that supply data regarding the vehicle, e.g. the rotational speed of the wheels, the distance traveled or the corners that the vehicle has taken, may be provided in the vehicle, in particular for the navigational aids.

Furthermore, that data regarding vehicle operating statuses, e.g. the fuel tank level, vehicle speed or temperatures, can be determined and used to provide a display, a warning or other measures, in the vehicle independently of positioning or navigational aids having sensors or detectors.

As a general rule, these two systems - the first system for positioning and navigational aids, and the second system for determining data regarding vehicle technical operating statuses—function independently of one another, especially as many motor vehicles are equipped with the second system but not the first. If both systems are used simultaneously in a motor vehicle, considerable expenditure with regard to components, space, and current consumption is involved.

SUMMARY OF THE INVENTION

The subject matter of the present invention has the following advantages: the number of components required and the associated costs can be reduced by using the sensors or detectors jointly for at least two systems. Furthermore, data which per se are only obtained and evaluated in one of the systems can also be evaluated in the other system or systems and used for various novel functions or purposes, without additional sensors or detectors for these data being required. Thus novel functions, particularly relating to driving safety and driver aids, can be implemented in a plurality of systems at low cost. This applies not only to systems in widespread use today but also to further future systems that supply traffic-specific telematics data. Telematics is an IT term that combines the words 'telecommunications' and 'informatics' and relates to the use of IT components, methods and systems in digital telecommunications.

Below is a list giving the meanings of the characters and abbreviations used in the following description and in the drawings.

| | |
|---|---|
| ABS | Anti-lock Brake System |
| CAN | Controller Area Network |
| FIS | Driver Information Systems |
| FS | Trip |
| GALA | Speed-dependent Volume Adaptation |
| GPS | Global Positioning System = Satellite Navigation System |
| KF | Comfort Functions |
| MF | Mobile Communications |
| NAV | Navigation |
| S | Sensor Systems for Data |
| TIM | Traffic Information Memory |
| TK | Fuel Tank |
| TBF | Vehicle Technical Operating Statuses |
| VF | Vehicle Speed |

Thus in the present invention good use is advantageously made of the fact that much of the data determined in the vehicle, e.g. the rotational speed of the wheels, vehicle speed or the fuel tank level, is required not only to provide displays regarding vehicle technical operating statuses according to the aforementioned second system but also for positioning and navigational aids according to the aforementioned first system, or can be used to implement novel functions and driver aids. In the opposite direction, certain data in the first system, e.g. regarding route conditions, the route to be taken or weather conditions, may be useful for influencing technical operating statuses in the vehicle. They can be used to trigger procedures for adapting the vehicle or driving style to the prevailing circumstances. These adaptations may be made by the driver, who is provided with a recommendation via a display, which he then carries out. Alternatively, the adaptations may be made automatically without the involvement of the driver, e.g. a rear fog light is switched on if conditions are foggy. In both instances, new data required in a system are not generated via additional sensors or detectors; instead, data are supplied by the other system by way of data exchange. Thus each datum can be generated just once, using a given sensor or detector.

A first embodiment type of the present invention is based on a vehicle in which data are determined in the first system using a first group of sensors or detectors and in the second or further system using a second or further group of sensors or detectors, some of the data in both or a plurality of systems being the same. Then costs can be reduced by combining sensors or detectors for gathering the same data for the two or further systems into a single sensor or detector that functions for both or further systems. For the sake of simplicity, the embodiments described below relate to two systems only. In Table 1 provided below, examples of data of this kind that are utilized in at least two systems are given. Note that some of the data supplied by a given sensor or detector can be evaluated and used for completely different functions and purposes in the two systems.

TABLE 1

| | 1st System: Radio/Driver Information Systems | 2nd System: Vehicle Technical Operating Statuses |
|---|---|---|
| GPS receiver | Navigation | Novel telematics functions (e.g. determining the location of a stolen vehicle) |
| Vehicle speed | Navigation, speed-dependent volume adaptation, block/enable user entries or displays | Display |
| Wheel impulses | Navigation | Speed measurement or ABS |
| Reverse gear engaged | Navigation | Display or transmission control |
| Rear window pane heating switched on | Navigation | Display |
| Mobile communications and mobile phone receiver, respectively, | Telematics | Mobile phone and novel telematics functions (see above) |
| Engine speed | Speed-dependent volume adaptation | Display, engine speed limitation |
| Light switched on | Illumination, day/night design | Illumination, display or warning buzzer |
| Ignition key inserted | Prompt input | Prompt input |
| Ignition switched on | Prompt input | Prompt input, display |

TABLE 1-continued

| | 1st System: Radio/Driver Information Systems | 2nd System: Vehicle Technical Operating Statuses |
|---|---|---|
| Clock time, wireless communications clock | Traffic Information Memory messages, calculation of estimated time of arrival, selection of relevant traffic-related messages, impact on choice of route (e.g. amount of traffic is often time-related) | Display, time-controlled functions (e.g. switching on stationary-vehicle heating/air conditioning) |
| Vehicle-specific data, such as tires (e.g. pressure, size, type) | Navigation | Tire pressure, chassis adjustments |

According to a second embodiment type of the present invention, data that are not present in the first system are determined and utilized in the second system. The data present in the second system are then additionally sent to the first system for evaluation. There are fewer cost savings associated with this type of embodiment. However, the advantage thereof is that novel functions and options can be implemented in the first system, i.e. the system for positioning and navigational aids, without additional sensors or detectors being required for this purpose in the first system. Examples of this embodiment type are shown in Table 2 below.

TABLE 2

| 2nd System: Vehicle Data (Vehicle Technical Operating Statuses) | 1st System: Radio/Driver Information Systems, Navigation |
|---|---|
| Vehicle-related problems, e.g. problems relating to the hydraulic fluid or brake fluid, brake lining thickness inadequate, problems relating to fluid pressure or engine temperature, etc. | Automatic display of vehicle repair shops or/and route guidance to a vehicle shop, may be automatically, if necessary as intermediate determination |
| Service-related problems, e.g. fuel tank empty, washer water container empty, etc. | Automatic display of gas stations or/and route guidance to a gas station, maybe automatically, if necessary as intermediate destination |
| Range calculated | Impact on choice of route or on suggested intermediate destinations (gas stations) |
| Clock time, wireless communications clock | Traffic Information Memory messages, calculation of estimated time of arrival, selection of relevant traffic-related messages, impact on choice of route (e.g. amount of traffic is often time-related) |
| Journey so far/periods spent stationary (rest stops) | Impact on choice of route or suggested intermediate destinations (rest areas, motels, hotels) |
| Variable vehicle data, e.g. driving with trailer, driving with roof rack | Impact on choice of route, as this may be associated with a speed limit or block/enable for certain sections of highway (e.g. block with respect to trailers, or minimum speed cannot be achieved) |
| Constant vehicle data, e.g. dimensions, total permitted weight, type of vehicle (e.g. heavy goods vehicle), permitted or actual maximum speed | Impact on choice of route, as this may be associated with a speed limit or block/enable for certain sections of highway (e.g. block with respect to bridges or underpasses) |

The table shows various data that are only obtained in the second system and per se only relate to vehicle technical operating statuses. These data are additionally used in the first system for resulting displays, recommendations, route changes, remedial action and such like.

According to a third embodiment type of the present invention, data obtained and utilized only in the first system are additionally used in the second system. This is useful if, due to special circumstances relating to navigation, technical measures in the vehicle are required or advisable, or constitute a particular benefit to the driver, or result in vehicle functions being adapted to navigating conditions, for example an inexperienced driver might be unaware of the need for such adaptations or might have forgotten about them. Examples are shown in Table 3 below.

TABLE 3

| 1st System: Navigation, Radio/Driver Information Systems | 2nd System: Vehicle Technical Operating Statuses; Vehicle Data |
|---|---|
| Position, state of route, state of road/street, traffic jam warnings, fog warnings, black ice warnings | Choice of speed/speed limits (e.g. in built-up areas via cruise control), setting chassis adjustment and/or setting tire pressure (e.g. on bad stretches of road), setting transmission (e.g. on inclines), setting anti-skid control (e.g. on black ice), switching parking lights (e.g. automatically switched, automatically switched on when driving in Scandinavian countries), switching headlights or low beams (e.g. automatically switched, switched on in tunnels and parking garages), switching high beams (e.g. automatically switched off in built-up areas); switching rear fog lights/front fog lights (e.g. automatically based on visibility) |
| Route | Switching turn signals (e.g. automatically before turning) |
| Altitude | Making engine adjustments |

Preferably, the two systems are linked so that data regarding a vehicle operating status determined in the second system trigger an ensuing, functionally or logically connected or useful navigation display in the first system. For example, if the second system determines that the fuel is running out, this triggers in the first system a navigation display indicating the closest gas station or a gas station within range.

Similarly, the two systems can be linked so that a status relating to navigation determined in the first system automatically triggers an ensuing required or appropriate measure relating to the vehicle technical operating status in the second system. For example, if the first system determines that the vehicle is travelling along a street with a speed limit, the first system may affect the cruise control in the second system, so that the vehicle's maximum speed is automatically limited to the maximum permitted speed.

BRIEF DESCRIPTION OF THE DRAWINGS

FIG. 1 shows a first device according to the present invention according to the first embodiment type of the present invention.

FIG. 2 shows a second device according to the present invention according to the first embodiment type of the present invention.

FIG. 3 shows a first device according to the present invention according to the second embodiment type of the present invention.

FIG. 4 shows a second device according to the present invention according to the second embodiment type of the present invention.

FIG. 5 shows a first device according to the present invention according to the third embodiment type of the present invention.

FIG. 6 shows a second device according to the present invention according to the third embodiment type of the present invention.

In FIG. 1, an evaluation unit 1 for navigation NAV is controlled by a sensor 2 for vehicle speed VF. Thus blocks 1 and 2 represent the aforementioned first system. An evaluation unit 3 for vehicle functions TBF is controlled by a sensor 4 for vehicle speed VF. Thus stages 3, 4 constitute the second system described. Thus these two systems for navigation and vehicle functions function independently of one another.

In FIG. 2, stages 3, 4 function in the same way as in FIG. 1. Sensor 2 that was shown in FIG. 1 is no longer present here. Instead, the data from sensor 4 are forwarded from evaluation unit 3 to stage 1 for navigation NAV. The dotted line indicates the other possible option, whereby the data from sensor 4 are forwarded from an evaluation unit 1 to stage 3 for TBF (Vehicle Technical Operating Statuses). As indicated, in the embodiment shown in FIG. 2, sensor 2 is not present, which reduces costs and saves space. Thus FIGS. 1, 2 correspond to the first embodiment type of the present invention described. In contrast with FIG. 1, in FIG. 2 the two systems are linked to one another, data being exchanged between evaluation unit 3 in the second system and evaluation unit 1 in the first system.

In FIG. 3, evaluation unit 3 for vehicle functions is controlled by sensor 4 for fuel tank level TK. According to FIG. 4, an output of evaluation unit 3 is connected to an input of evaluation unit 1 Thus data regarding the fuel tank level, which are provided per se for unit 3 are forwarded to unit 1 There, these data can additionally be used for further functions, without unit 1 requiring additional sensors for this purpose. In this case too, data are exchanged between evaluation unit 3 and evaluation unit 1 Herein, in contrast with the FIGS. 1, 2, data that are otherwise not present in evaluation unit 1 are forwarded to evaluation unit 1and therefore allow novel functions to be carried out in the first system. Thus FIGS. 3,4 constitute an embodiment of the second type of embodiment of the present invention described.

In FIG. 5, unit 1 for navigation NAV is controlled by a sensor 2 for the trip FS, while unit 3 for vehicle functions and sensor 4 function independently thereof. FIG. 6 shows per se the same arrangement as FIG. 5. However, the data originating from sensor 2 are additionally forwarded from stage 1 to unit 3 for vehicle functions via line 8 This means vehicle functions can be controlled based on the conditions along the route, as shown in Table 3.

In FIG. 7, when the route to be taken is displayed on or navigation is carried out with the help of map 9, current vehicle position P is indicated by a triangle, and the route recommended to the driver is indicated by bold road route 10. Let us assume that the amount of fuel remaining slowly dwindles during the journey. When the amount of fuel remaining reaches a certain level, which is determined by a sensor in the second system, a message with various selectable options is displayed as part of the first system.

FIG. 8 shows a message of this kind with various options, these being displayed due to the imminent shortage of fuel. The driver can preferably select the "Nearest on route" menu item if he does not wish to make a detour of any kind. The "Select from list" option is particularly suitable if the driver prefers certain gas station chains. The "Select from map" option allows him to select any of the gas stations displayed. If the fuel level is so low that the vehicle is in danger of running out altogether, he can select "Nearest in surrounding area". Let us assume that in this example he has selected the "Nearest on route" option so that the nearest gas station on the originally planned route is displayed as an intermediate destination.

FIG. 9 shows map 9, on which gas station T1, which has been selected, is displayed. Other gas stations in the surrounding area are also shown here as additional information. Shortly before the vehicle reaches the gas station, the message mask appears containing information regarding the fuel tank.

FIG. 10 shows a message mask of this kind that contains various data that will be useful for the fuel-filling procedure. For example, the driver can decide whether he wishes to fill the fuel tank completely or merely to add a specific amount or fuel based on the remaining distance to be covered, the amount of money he has with him, and such like.

FIG. 11 shows that after purchasing fuel the driver continues along the originally planned route, correspond to bold road route 10.

FIG. 12 shows an example of how the components described are connected in terms of circuits, namely via bus systems. The figure shows sensor system S that supplies the data, a stage for comfort functions KF, evaluation unit 1 for radio/navigation NAV according to the aforementioned first system, evaluation unit 3 for supplying vehicle information TBF according to the aforementioned second system, a mobile communications stage MF, a GPS pickup, and a instrument cluster 11 for visually displaying various data. In the case of certain data, the visual display for the driver may be supplemented or replaced by acoustic information. It is advantageous if the components are connected via a CAN bus, which is often already present. If necessary, converters for carrying out conversions between a plurality of bus systems that are present, e.g. interior bus, engine bus, or comfort bus, can be used.

Figure 7:
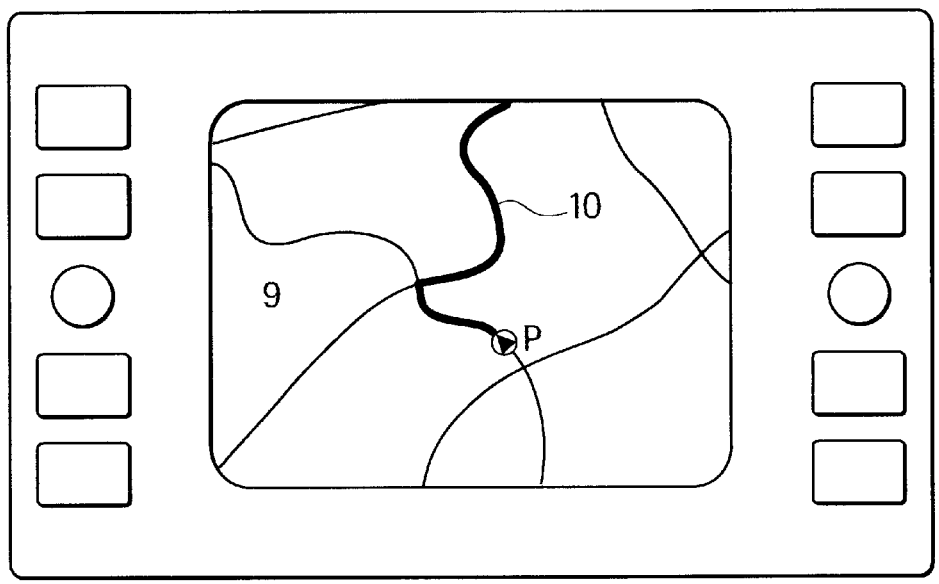
FIG. 7 shows an example of a novel functionality that incorporates service-related problems into the navigation system.
Figure 8:
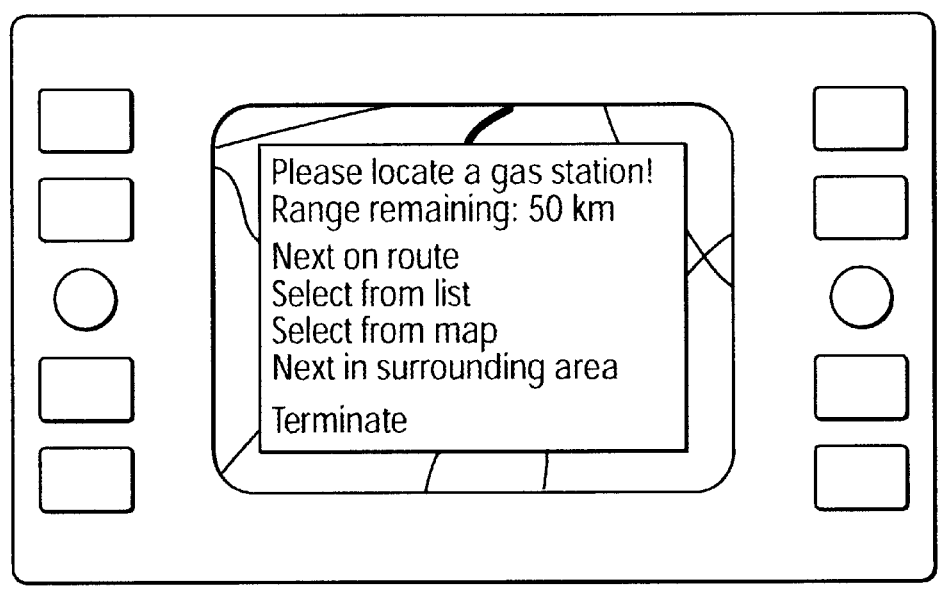
FIG. 8 shows another example of a novel functionality that incorporates service-related problems into the navigation system.
Figure 9:
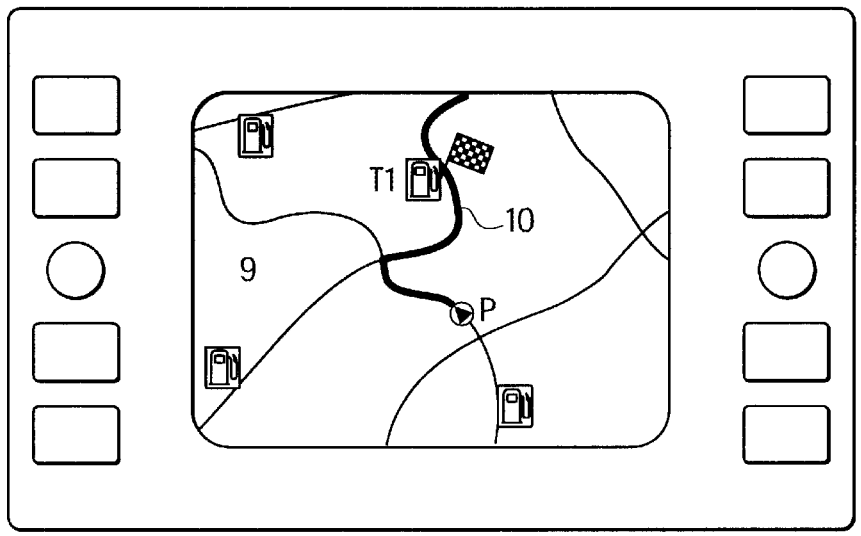
FIG. 9 shows a first further example that may chronologically follow the example shown in FIGS. 7
Figure 10:
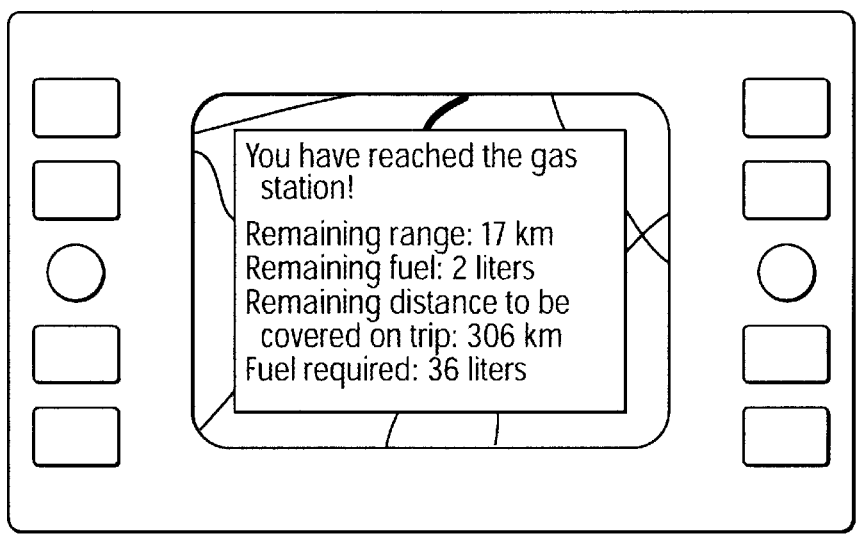
FIG. 10 shows a second further example that may chronologically follow the example shown in FIGS. 7 and 8
Figure 11:
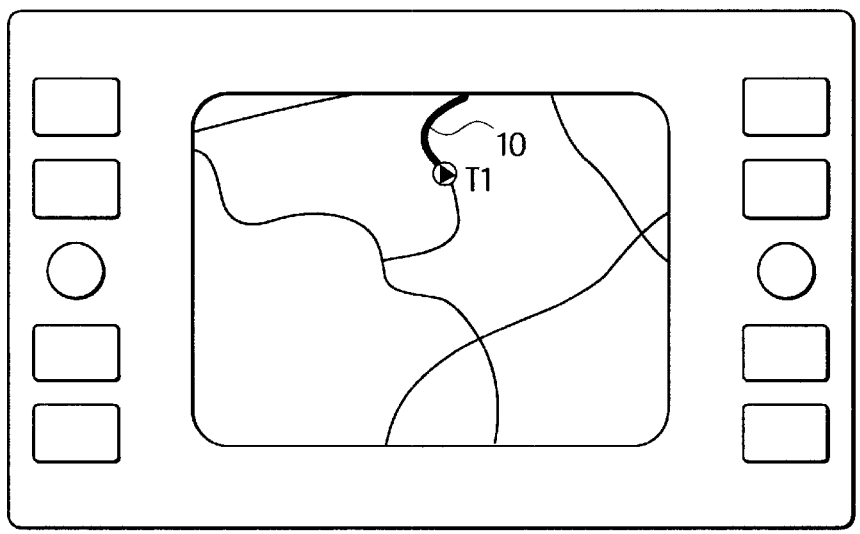
FIG. 11 shows a third further example that may chronologically follow the example shown in FIGS. 7 and 8
Figure 12:
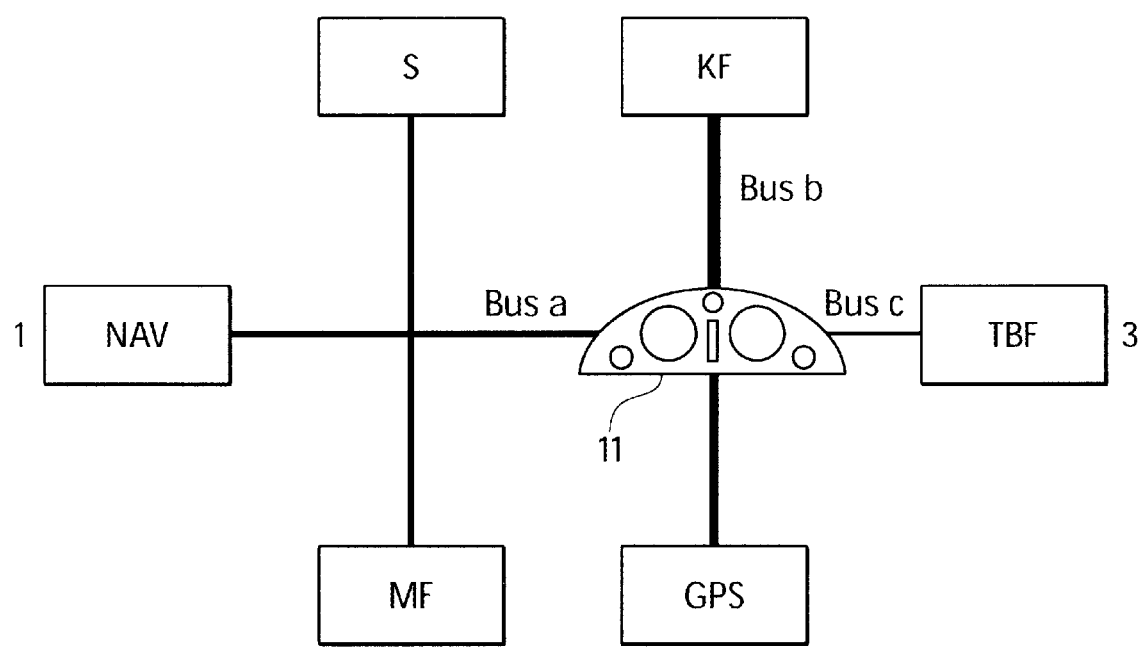
FIG. 12 shows a block diagram illustrating how the individual components are connected via bus systems.

What is claimed is:

1. A device for controlling and monitoring a vehicle, comprising:
    a first system for evaluating data and connected to a first group of one of sensors and detectors; and
    at least a second system for evaluating the data and connected to a second group of one of sensors and detectors, wherein:
        the first system and the second system are linked together such that the data supplied by the sensor are evaluated in both the first system for a first purpose and in the second system for a second purpose that is different than the first purpose.

2. The device according to claim 1, wherein the data corresponds to one of at least one of radio/driver information, vehicle technical operating statuses, and further telematics data.

3. The device according to claim 2, wherein:
    the at least one of radio/driver information is for positioning and navigational aids.

4. The device according to claim 1, wherein:

the first system includes a first evaluation unit, the second system includes a second evaluation unit, and the data that are utilized in both the first system and the second system are sent from the sensor to the first evaluation unit and the second evaluation unit.

5. The device according to claim 4, wherein:

the sensor is connected to one of the first data evaluation unit and the second data evaluation unit, and an output of the one of the first data evaluation unit and the second data evaluation unit connected to the sensor is connected to the other one of the first data evaluation unit and the second data evaluation unit.

6. The device according to claim 4, wherein:

the sensor is connected in parallel to inputs of the first data evaluation unit and of the second data evaluation unit.

7. The device according to claim 1, wherein:

the first system includes a first evaluation unit, and the data relating to vehicle technical operating statuses are only evaluated in the second system and are sent to the first evaluation unit in order to trigger functions relating to at least one of positioning aids and navigational aids.

8. The device according to claim 7, wherein:

additional functions include functions relating to a visual display, acoustic information, reaction by the vehicle, a switching procedure in the vehicle, and adaptation of driving style.

9. The device according to claim 7, wherein:

the second system includes a second data evaluation unit, the sensor is connected to the first data evaluation unit, and an output of the first data evaluation unit is connected to the second data evaluation unit.

10. The device according to claim 1, wherein:

the second system includes a second evaluation unit, and the data relating to at least one of radio/driver information are only evaluated in the first system and are sent to the second evaluation unit in order to trigger functions relating to vehicle technical operating statuses.

11. The device according to claim 10, wherein:

additional functions include functions relating to a visual display, acoustic information, reaction by the vehicle, a switching procedure in the vehicle, and adaptation of driving style.

12. The device according to claim 10, wherein:

the first system includes a first data evaluation unit, the sensor is connected to the second data evaluation unit, and an output of the second data evaluation unit is connected to the first data evaluation unit.

13. The device according to claim 10, wherein:

the at least one of radio/driver information is for positioning and navigational aids.

14. The device according to claim 1, wherein:

the first system and the second system are linked so that the data regarding a vehicle operating status determined in the second system trigger an ensuing one of a response that is one of functionally and logically connected and a navigation>b display in the first system.

15. The device according to claim 1, wherein:

the first system and the second system are linked so that a status relating to navigation determined in the first system automatically triggers an ensuing measure relating to a vehicle technical operating status in the second system, the ensuing measure being one of required and appropriate.

* * * * *

UNITED STATES PATENT AND TRADEMARK OFFICE
CERTIFICATE OF CORRECTION

PATENT NO.    : 6,459,967 B1
DATED         : October 1, 2002
INVENTOR(S)   : Stefan Otto It is certified that error appears in the above-identified patent and that said Letters Patent is hereby corrected as shown below:

Column 4,
Line 19, change "anti-skid control" to -- device to prevent wheel-spin --

Signed and Sealed this

Sixteenth Day of December, 2003

JAMES E. ROGAN
*Director of the United States Patent and Trademark Office*